United States Patent [19]

Uchida

[11] Patent Number: 5,497,245

[45] Date of Patent: Mar. 5, 1996

[54] FACSIMILE MACHINE INCLUDING A POWER SOURCE ADAPTOR USED THEREIN

[75] Inventor: Shirou Uchida, Isehara, Japan

[73] Assignee: Ricoh Company, Ltd., Tokyo, Japan

[21] Appl. No.: 93,690

[22] Filed: Jul. 20, 1993

[30] Foreign Application Priority Data

Jul. 21, 1992 [JP] Japan .................................. 4-193590

[51] Int. Cl.$^6$ ...................................................... H04N 1/00
[52] U.S. Cl. ........................... 358/406; 358/400; 358/442
[58] Field of Search ..................................... 358/400, 406, 358/473, 442, 468; 348/730; 439/502, 505, 638, 639; 307/64–66; H04N 1/00

[56] References Cited

U.S. PATENT DOCUMENTS

| | | | |
|---|---|---|---|
| 4,835,410 | 5/1989 | Bhagwat et al. | 307/64 |
| 5,030,128 | 7/1991 | Herron et al. | 439/639 |
| 5,282,054 | 1/1994 | Oana et al. | 358/406 |

FOREIGN PATENT DOCUMENTS

| | | |
|---|---|---|
| 63-262954 | 9/1986 | Japan . |
| 61-163473 | 10/1988 | Japan . |
| 04-239248 | 8/1992 | Japan . |
| 05-236169 | 9/1993 | Japan . |
| 2237941 | 5/1991 | United Kingdom . |

*Primary Examiner*—Kim Yen Vu
*Attorney, Agent, or Firm*—Oblon, Spivak, McClelland, Maier & Neustadt

[57] ABSTRACT

A portable facsimile machine used with various power sources, including an AC power source, a car battery power source and a rechargeable battery power source, has an improved operability. The portable facsimile machine comprises a main body performing a facsimile function and a power source adaptor provided separately from the main body. The power source adaptor is adapted for use with one of the various power sources. The portable facsimile machine is further provided with an attaching mechanism for detachably attaching the power source adaptor to the main body. The contact terminals of the power source adaptor automatically make contact with the contact terminals of the main body when the power source adaptor is attached to the main body by means of the attaching mechanism. Further, a portable facsimile machine comprises a main body performing a facsimile function and a scanning unit provided on the main body which can be either in a position where the scanning unit is attached to the main body or in a position where the scanning unit is separated from the main body. The portable facsimile machine is provided with attaching mechanism for detachably attaching the scanning unit to the main body.

13 Claims, 14 Drawing Sheets

TO AC POWER SOURCE RECEPTACLE

TO CAR CIGARETTE LIGHTER SOCKET

FACSIMILE MACHINE INCLUDING A POWER SOURCE ADAPTOR USED THEREIN

BACKGROUND OF THE INVENTION

1. Field of the Invention

The present invention relates to a facsimile machine including a power source adaptor used therein, and more specifically to portable facsimile machines which are improved in portability and operability.

2. Description of the Related Art

Recently, various types of portable facsimile machines have been available on the market. Many facsimile machines among these are adapted to use with a so called 3-way power source adaptor.

As a portable facsimile machine, for example, the machine described in Japanese Laid-Open Patent Application No. 63-262954 serves as a reference. As a power source adaptor used with a portable facsimile machine, for example, the apparatus described in Japanese Laid-Open Utility Model Application No. 61-163473 serves as a reference.

The above-mentioned prior art adopts completely different shapes and connections for the 3 kinds of power source, an AC power source for home use, a DC power source from automobiles (hereinafter called car battery power source), and a power source utilizing battery cells (hereinafter called battery power source). The prior art has problems described in the following.

A battery power source unit incorporating therein battery cells (dry battery cells or rechargeable battery cells) is generally adapted to be directly connected to a portable facsimile machine, while connections for the other two power sources, an AC power source adaptor and a car battery power source adaptor, are adapted to have completely different shapes, respectively. Exclusively used connection cables are used as a connection between a portable facsimile machine and the adaptors (secondary side) and between the adaptors and respective power sources (primary side).

There is no problem with the primary side, but the secondary side, which is a cable connection between the portable facsimile machine and the adaptor, has a problem in that the operation of the connection is inconvenient. There are additional problems in that if the cable on the secondary side has excessive length, there is a risk that the cable becomes broken and the possibility that the cable picks up noise increases. In order to solve these problems, strengthening of the cable and addition of noise shielding parts on the secondary side have been taken.

Additionally, there is a problem in that when portability of a portable facsimile machine is concerned, it is inconvenient that there are separate parts which must be used other than the facsimile machine itself.

Further, there lies a problem in that conventional portable facsimile machines require different battery chargers respectively suitable for the voltages available in each country.

SUMMARY OF THE INVENTION

It is a general object of the present invention to provide a portable facsimile machine including a power source adaptor in which the above-mentioned problems are eliminated.

A more specific object of the present invention is to provide a portable facsimile machine including a power source adaptor used therein in which portability and operability are improved.

Another object of the present invention is to provide a portable facsimile machine in which a scanning unit of the scanner can be separated from a main body of the facsimile machine.

In order to achieve the above-mentioned objects, a portable facsimile machine according to the present invention, which portable facsimile machine is to be used with various power sources including an AC power source, a car battery power source and a rechargeable battery power source, comprises:

a main body performing a facsimile function and having first contact terminals for electrical power supply;

a plurality of power source adaptors separately provided from the main body and respectively corresponding to one of various power sources, each power source adaptor having second contact terminals making contact with the first contact terminals so as to supply an electric power to the main body; and attaching means for detachably attaching one of the power source adaptors to the main body, the first contact terminals automatically making contact with the second terminals when one of the power source adaptors is attached to the main body by the attaching means.

According to the present invention, three types of power source adaptors have a uniform shape and the connection methods thereof to the main body of the portable facsimile machine are the same. Thereby, operability is improved and manufacturing costs are reduced as well as contributing to unifying a design thereof.

A portable facsimile machine according to the present invention, which portable facsimile machine is to be used with various power sources including an AC power source, a car battery power source and a rechargeable battery power source, comprises:

a main body performing a facsimile function and having first contact terminals for electrical power supply and a socket for connecting a power supply cable for an AC power source or a car battery power source, the main body further including a battery charger connected to the socket and the first contact terminals;

a battery power source unit, separately provided from the main body, having second contact terminals making contact with the first contact terminals so as to supply electric power to the main body; and attaching means for detachably attaching the battery power source unit to the main body, the first contact terminals automatically making contact with the second terminals when one of the power source adaptors is attached to the main body by the attaching means, the main body being supplied with electric power via the charger and the battery power source unit when connected with the AC power source or the car battery power source.

According to the present invention, since the battery charger is provided in the main body of the portable facsimile machine, operability for charging operation is particularly improved. Further, duplicate parts can be eliminated, resulting in reduction in manufacturing costs.

A portable facsimile machine according to the present invention, comprising:

a main body performing a facsimile function;

a scanning unit being provided on the main body so that the scanning unit can be either in a position where the scanning unit is attached to the main body or in a position where the scanning unit is separated from the main body; and attaching means for detachably attaching the scanning unit to the main body.

According to the present invention, since the scanning unit can be used as a hand scanner by separating it from the main body, more generalized use of the portable facsimile machine can be realized.

Other objects, features and advantages of the present invention will become more apparent from the following detailed descriptions when read in conjunction with the accompanying drawings.

DETAILED DESCRIPTION OF THE PREFERRED EMBODIMENTS

A description will now be given, with reference to the drawings, of embodiments according to the present invention.

Figure 1:
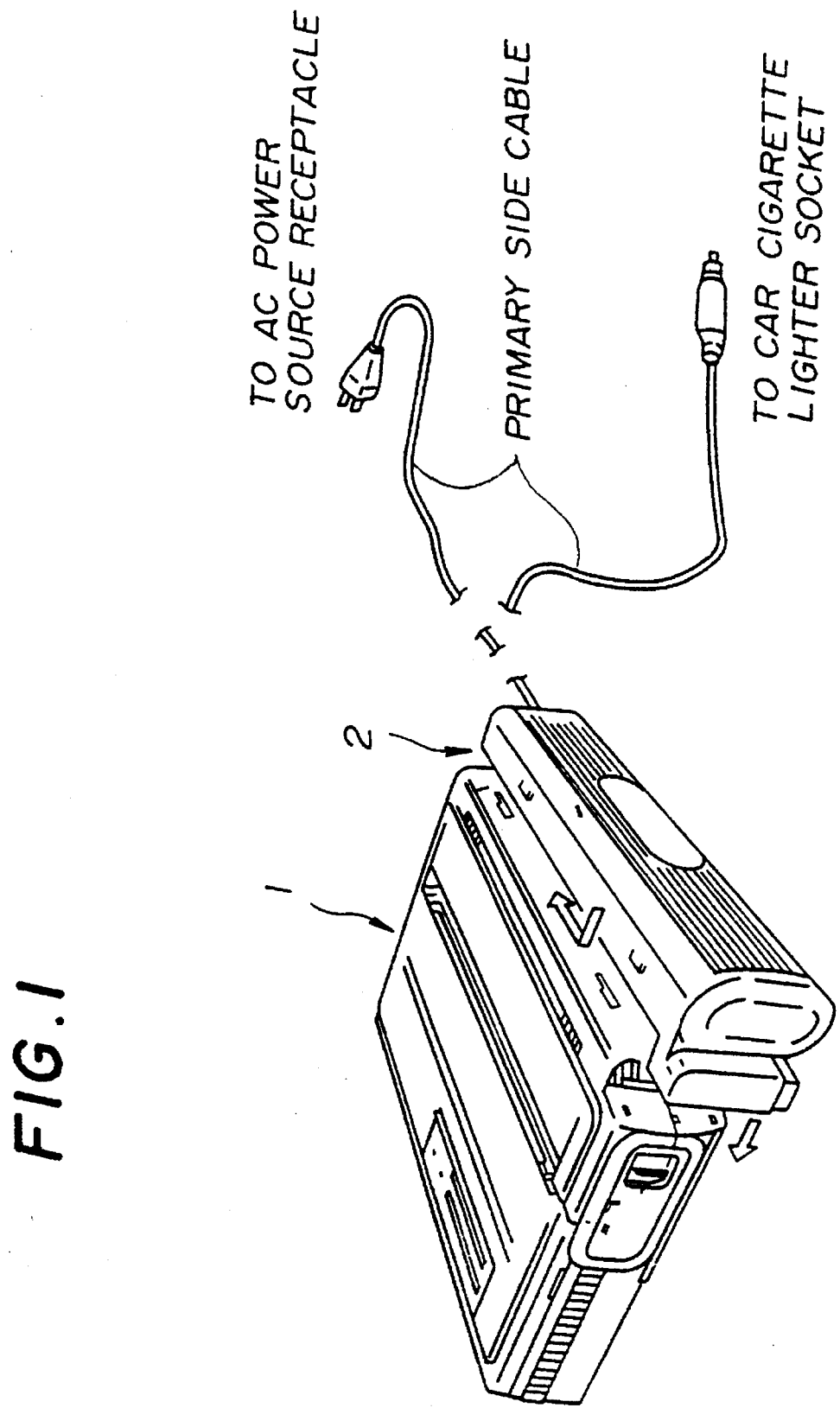
FIG. 1 is a perspective view of an embodiment according to the present invention.

FIG. 1 is a perspective view of an embodiment of a portable facsimile machine according to the present invention. In the figure, a notation 1 indicates a main body of the portable facsimile machine, and a notation 2 indicates a power source adaptor. The power source adaptor 2 can be either an AC power source adaptor 2a, a car battery power source adaptor 2b or a battery power source unit 2c.

FIG. 1 shows a state where one of those adaptors 2a, 2b or 2c, for example the AC power source adaptor 2a, is being set to the main body 1 of the portable facsimile machine. As described in the following, a power source adaptor attaching surface of the main body 1 of the portable facsimile machine is provided with a plurality of holes for fixing the power source adaptor 2. Guide claws formed on the power source adaptor are inserted into respective holes so that the power source adaptor 2 is attached and fixed to the main body 1 of the portable facsimile machine.

It should be noted that, as described in the following, in the power source adaptor according to the present embodiment, an electrical connection between the power source adaptor 2 and the main body 1 is made simultaneously with the mechanical connection of the power source adaptor 2 to the main body 1 of the portable facsimile machine. Consequently, no cable is required for the secondary side and a cable is provided only on the primary side.

A description will now be given, individually, of each power source adaptor.

Figure 2:
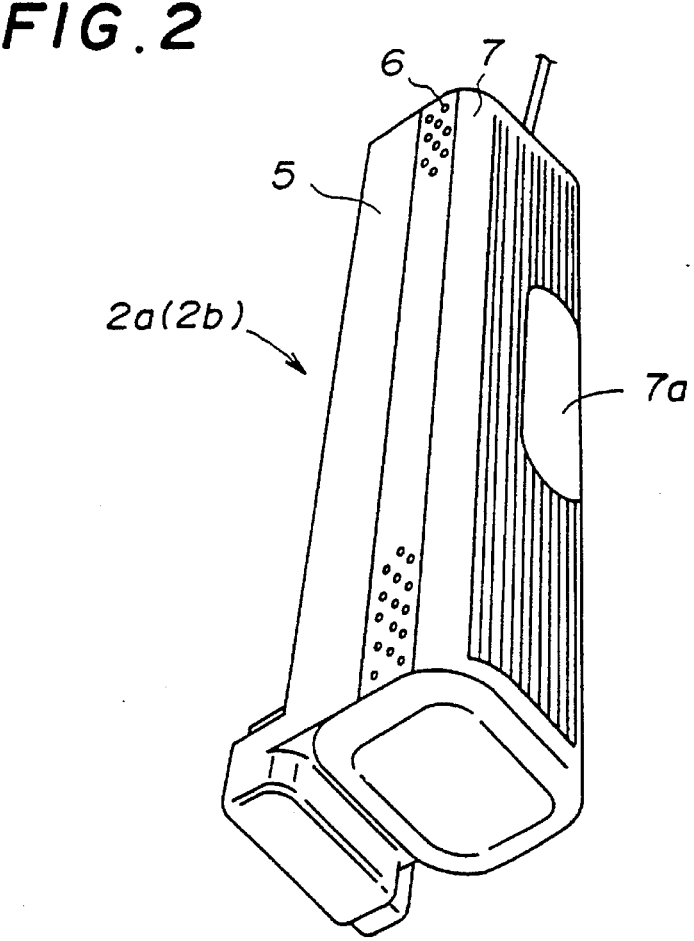
FIG. 2 is a perspective view of an AC power source adaptor or a car battery power source adaptor.

FIG. 2 is a perspective view of the AC power source adaptor 2a or the car battery power source adaptor 2b. Each of these power source adaptors 2a and 2b comprises generally three portions, a case 5 engaging with the main body 1 of the portable facsimile machine, a spacer portion 6, and a lid 7.

Figure 3:
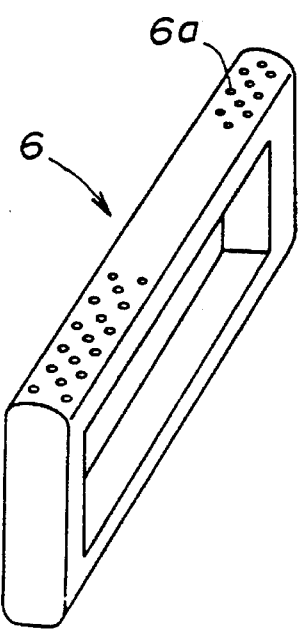
FIG. 3 is a perspective view of a spacer.

The case 5 is a main body of the power source adaptor. In a case where the adaptor is the AC power source adaptor 2a, an AC/DC converter is incorporated in the case 5, and in the car battery power source adaptor 2b, a DC/DC converter is incorporated. The spacer portion 6 is configured as shown in FIG. 3. In the case of the above two adaptors, the spacer portion 6 is provided with a plurality of ventilation holes 6a on a surface so that a heat generated by the converter can be released. In a case of the battery power source unit 2c, the ventilation holes are not provided. The purpose of the provision of the space 6 to the battery power source unit 2c is to make an outer profile of the battery power source unit 2c the same as that of the other adaptors 2a and 2b. It should be noted that a primary side cable is provided through the spacer portion 6. The lid 7 covers the case 5. A portion indicated by notation 7a on the lid 7 is a portion for preventing a slippage during handling.

Figure 8:
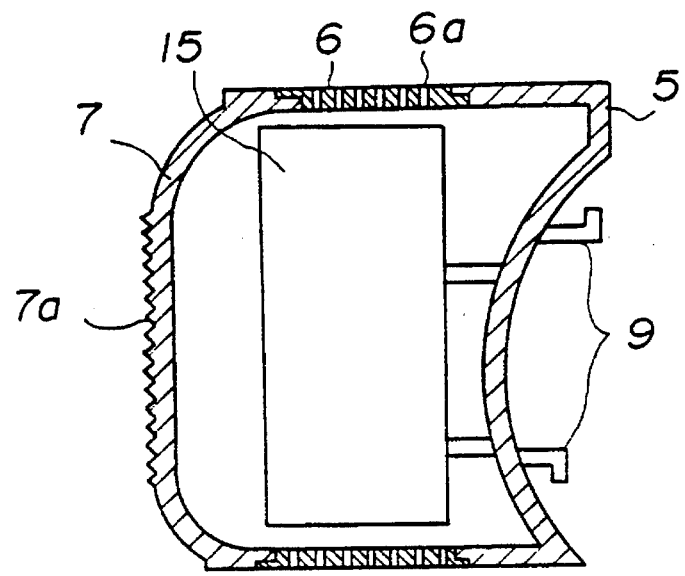
FIG. 8 is a cross sectional view of the AC power source adaptor or the car battery power source adaptor.

A cross section of the AC power source adaptor 2a or the car battery power source adaptor 2b is shown in FIG. 8. In the figure, notation 15 indicates the AC/DC converter or the DC/DC converter.

Figure 4:
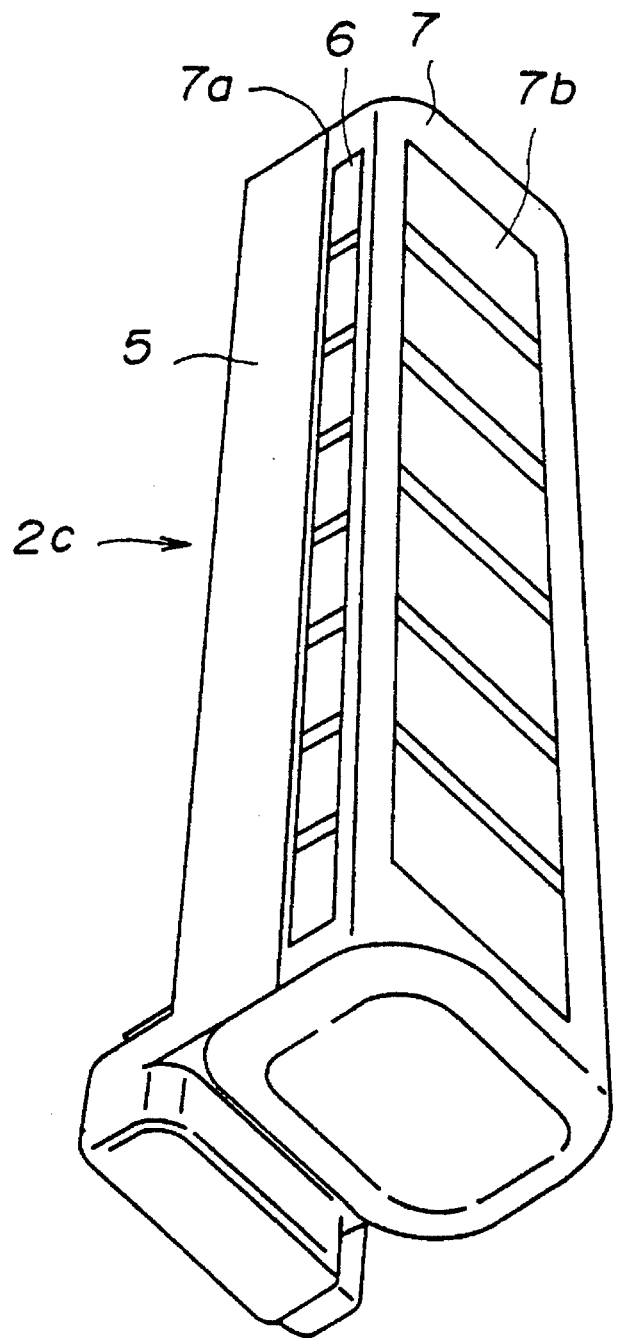
FIG. 4 is a perspective view of a battery power source unit.

FIG. 4 is a perspective view of the battery power source unit 2c. Similar to the adaptors 2a and 2b, the battery power source unit 2c also comprises three main portions, the case 5, the spacer portion 6 and the lid 7.

In the case 5, a rechargeable battery and a circuit plate for charge control are incorporated. Instead of the ventilation holes, as described above, a number of solar battery cells 7b are applied on the surface of the spacer portion 6. The solar battery cells 7b are also applied to the lid 7.

The above-mentioned three portions, the case 5, the spacer portion 6 and the lid 7, are assembled together with adhesive after the converter or the battery is provided therein.

Figure 5:
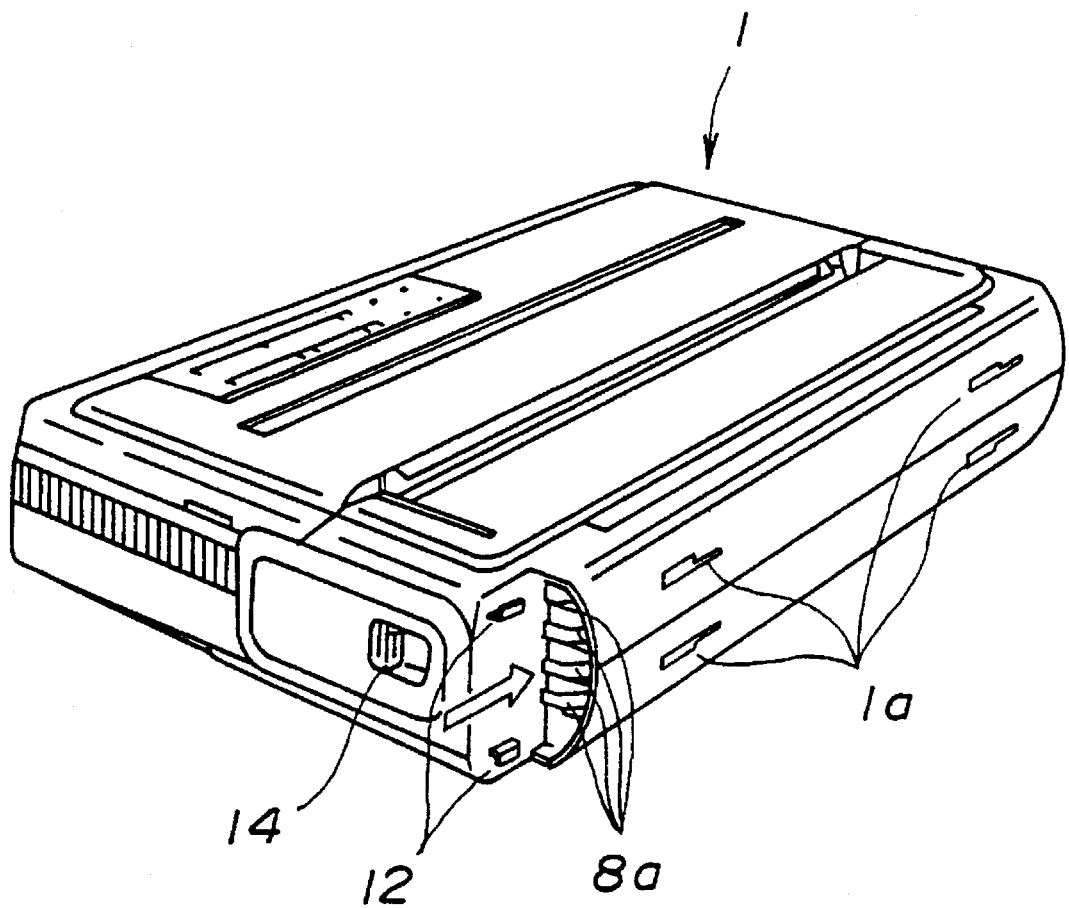
FIG. 5 is a perspective view of the main body of the portable facsimile machine shown in FIG. 1.
Figure 6:
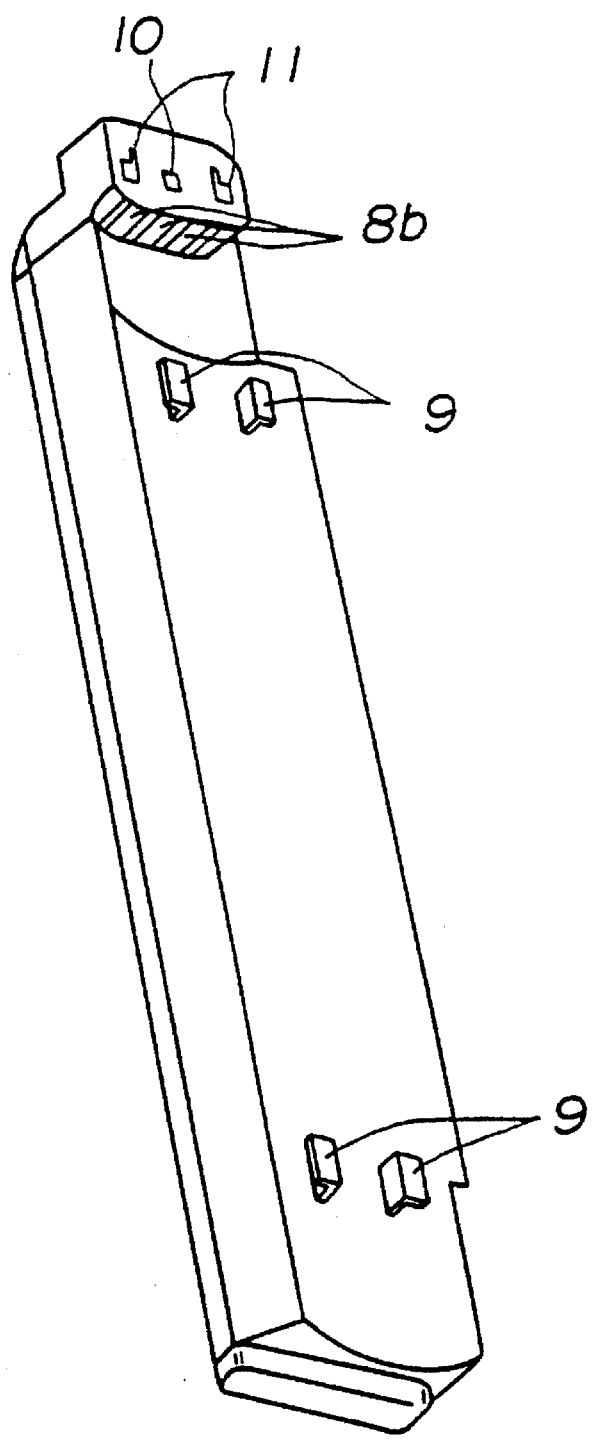
FIG. 6 is a perspective view of the battery power source unit shown in FIG. 4 showing a construction of connecting portions.

FIG. 5 shows a construction of the adaptor side of the main body 1 of the portable facsimile machine, and FIG. 6 shows a construction of a surface of the battery power source unit 2c, which surface engages with the main body 1 of the portable facsimile machine. A description will be given below of a connecting means of the battery power source unit 2c to the main body 1.

As shown in FIG. 5, on the adaptor side of the main body 1 of the portable facsimile machine, there are provided a plurality of holes 1a which engage with a plurality of guiding claws 9 provided on the surface, facing the main body 1, of the battery power source unit 2c described below. The above-mentioned guiding claws 9 are, as apparent from FIG. 6, formed so that the upper portion of each claw 9 is wider than the lower portion thereof. The battery power source unit 2c can be attached to the main body 1 of the portable facsimile machine by inserting the guiding claws 9 into the wider portion of the respective holes 1a on the main body 1 and then sliding the battery power source unit 2c in a direction indicated by the arrow in FIG. 5.

At this time, a plurality of guiding claws 12 provided on the main body 1 of the portable facsimile machine are engaged with a plurality of holes 11 provided on the battery power source unit 2c in the same manner as that of the guiding claws 9 and the holes 1a. Additionally, a locking hole 10 is provided on the surface where the holes 11 are provided so as to lock the battery power source unit 2c after the battery power source unit 2c is slid to the proper position. This locking is achieved by inserting a locking claw 14a into the locking hole 10 by sliding a lever 14 slidably provided on a side cover 13 of the main body 1 (also refer to FIG. 7).

By means of the mechanical connection mentioned above, the battery power source unit 2c can be attached and locked to the main body 1 of the portable facsimile machine.

The electrical connection between the battery power source unit and the main body 1 can be made as described in the following. On the side surface of the main body 1, which surface faces the battery power source unit 2c when the battery power source unit 2c is attached to the main body 1, a plurality of contact terminals 8a are provided. At the corresponding positions on the battery power source unit 2c, a plurality of contact terminals 8b are also provided. These respective contact terminals 8a and 8b make contact with each other when the battery power source unit 2c is attached to the main body 1 of the portable facsimile machine, and thus the electrical connection between the battery power source unit 2c and the main body 1 is made.

Figure 11:
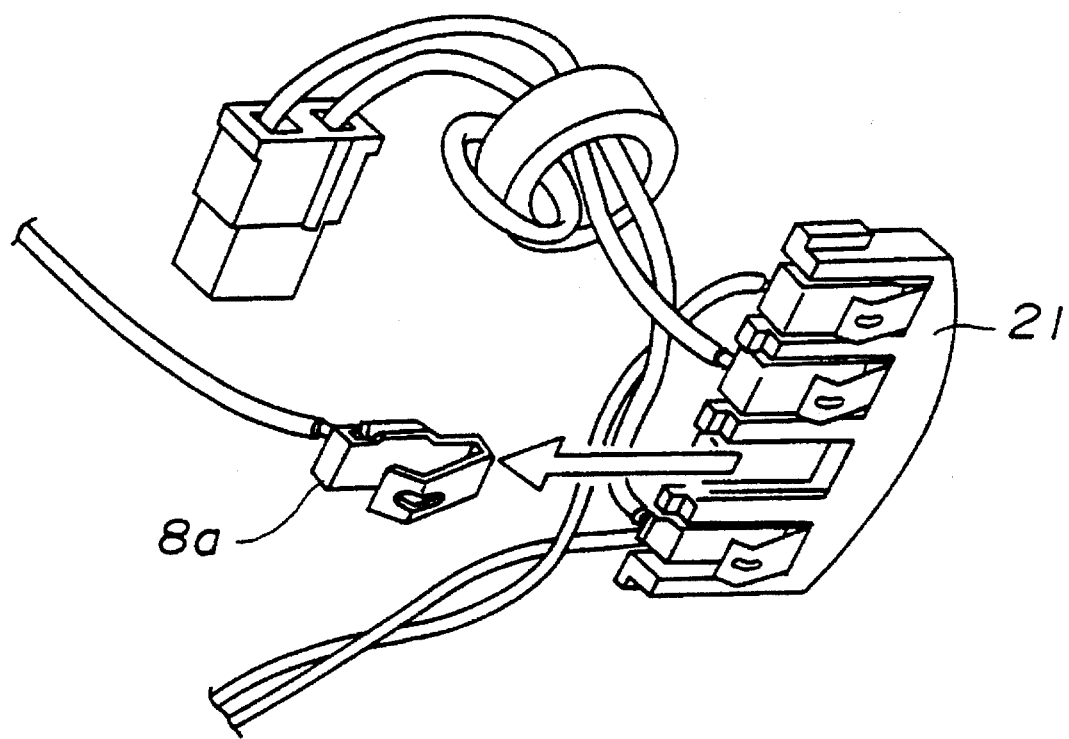
FIG. 11 is a perspective view for explaining an assembly of a contact terminal to a terminal plate.
Figure 12:
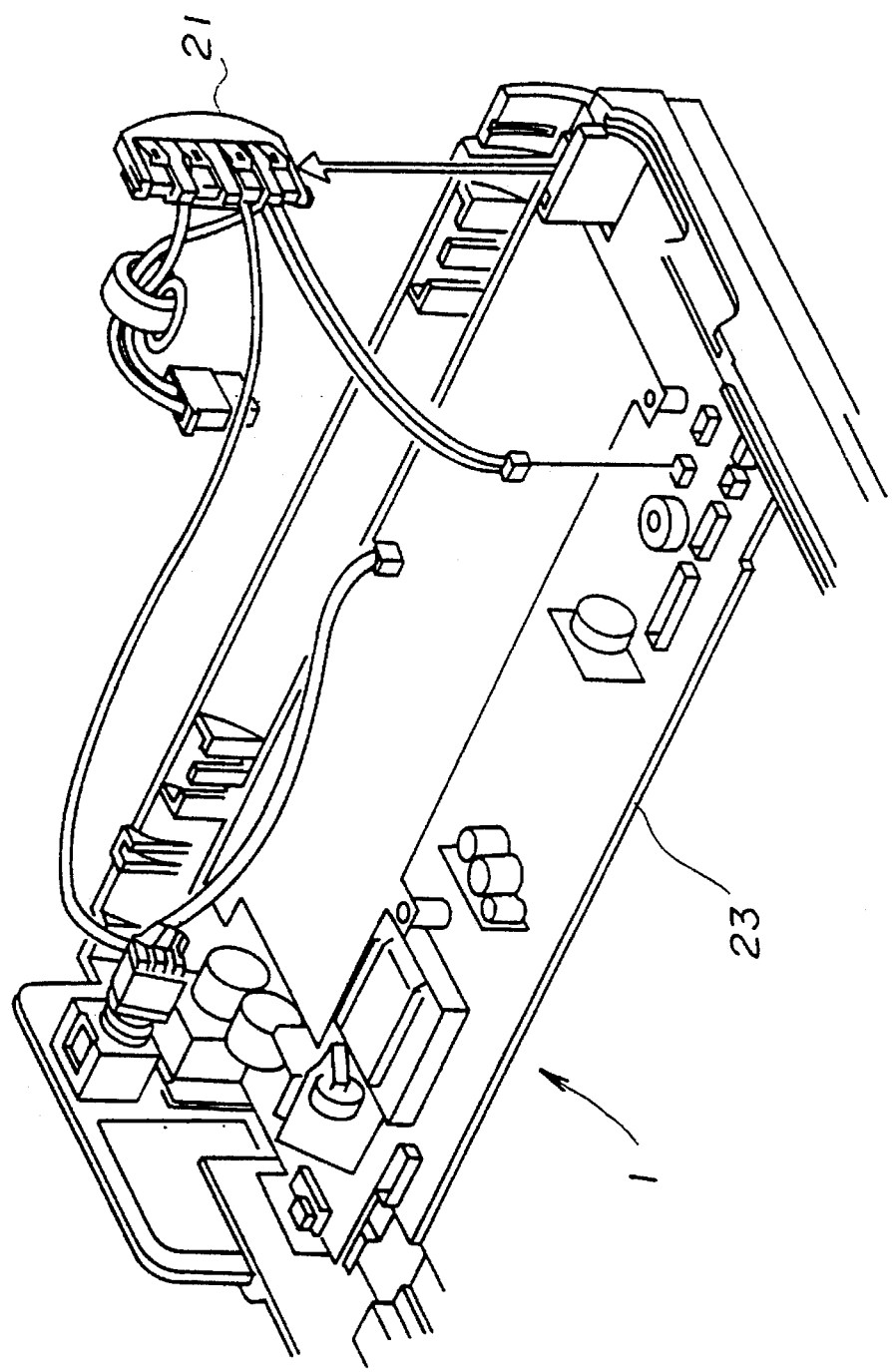
FIG. 12 is a perspective view for explaining an assembly of the terminal plate to a main body of the portable facsimile machine.

The above-mentioned contact terminals 8a are, as shown in FIGS. 11 and 12, detachably attached to grooves provided on a terminal plate 21. Additionally, the terminal plate 21 is also detachably attached to a groove between an upper case and a lower case of the main body 1 of the portable facsimile machine. These constructions are convenient for assembling and maintenance of the portable facsimile machine.

Figure 7:
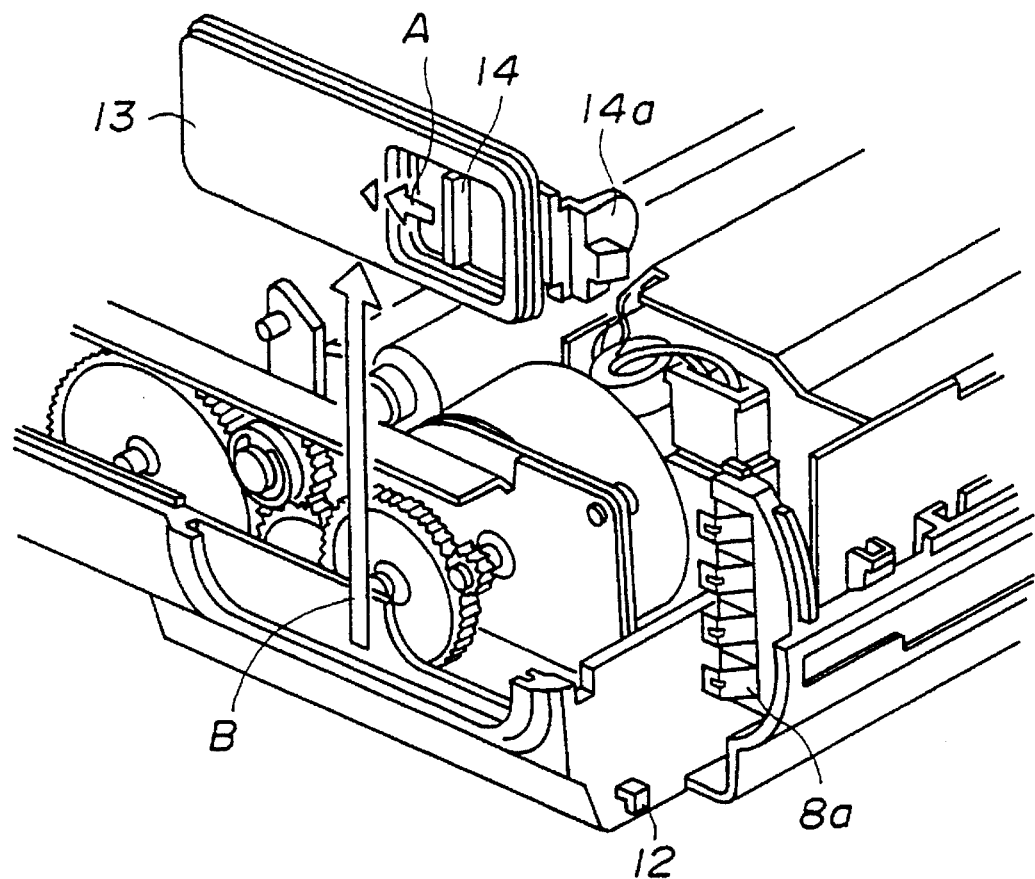
FIG. 7 is a perspective view of a part of the portable facsimile machine for explaining an engagement locking mechanism for a power source adaptor and the main body of the portable facsimile machine.

To release the above-mentioned connections, and to remove the battery power source unit 2c from the main body 1 of the portable facsimile machine, the lever 14 on the side cover 13 is slid in a direction indicated by an arrow A in FIG. 7 against a biasing force. By this slide of the lever 14, the locking claw 14a moves out of the locking hole 10, and thereby the battery power source unit 2c can be slid in the opposite direction of the arrow in FIG. 5.

A description will now be given of an interior of the battery power source unit 2c.

Figure 9:
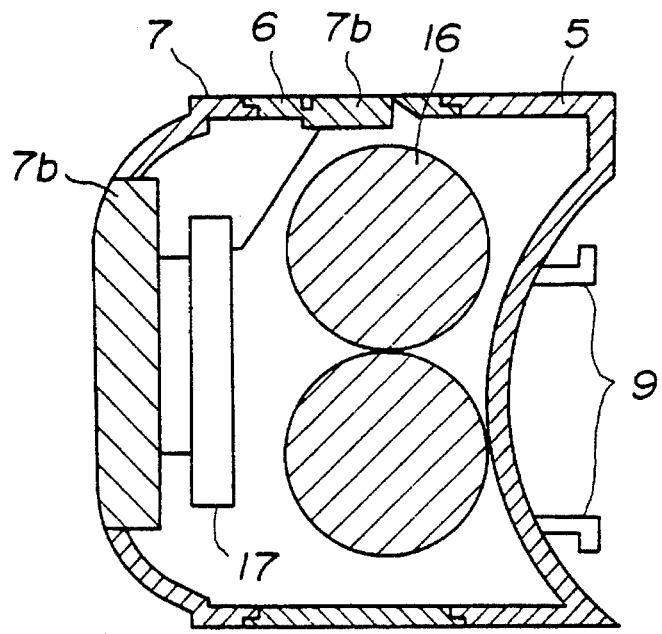
FIG. 9 is a cross sectional view of the battery power source unit.
Figure 10:
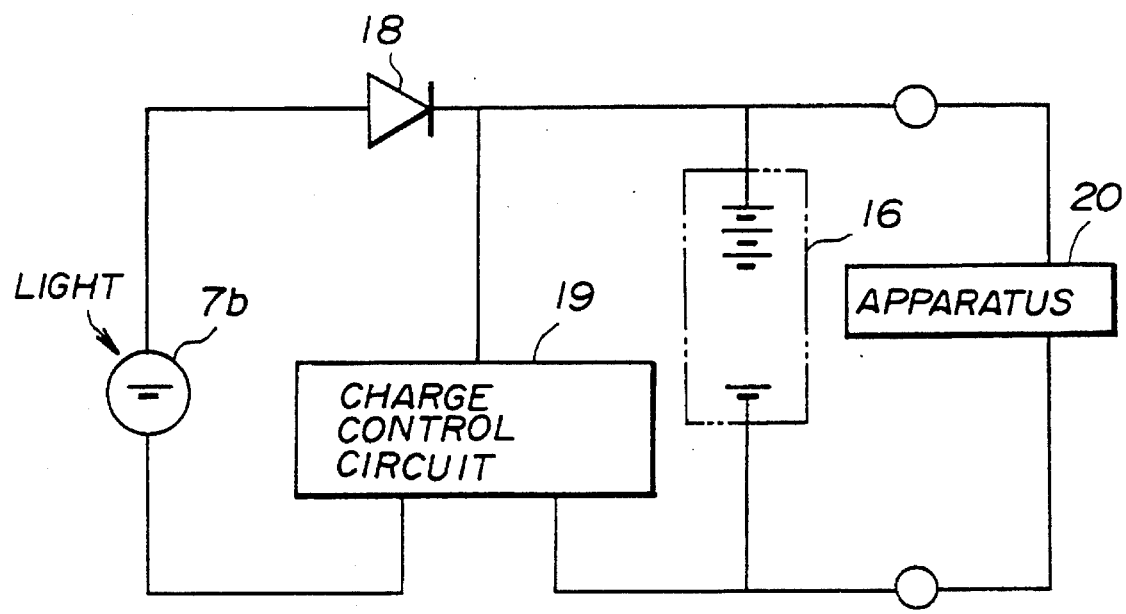
FIG. 10 is a circuit diagram of a basic circuit having a solar battery as an assisting power source.

A cross sectional view of the battery power source unit 2c is shown in FIG. 9. In the figure, notation 16 indicates a battery cell and notation 17 indicates a circuit board for charge control. Other notations are the same as described before.

In the battery power source unit 2c, the battery cell 16 is used as a power source for driving the portable facsimile machine, and the solar battery cells 7b are used, as an assisting power source, for supplying to the battery cell 16 a small electric current so as to charge the battery cell 16.

An example of a basic circuit is shown in a condition of using the battery 16 as a main power source and using the solar battery cells 7b as an assisting power source. In the figure, notation 18 indicates a rectifier diode, 19 a charge control circuit, and 20 a portable facsimile machine. Other notations are the same as in previous figures.

According to the above-mentioned embodiment, three types of power source adaptors have a uniform shape and identical methods of connection to the main body of the portable facsimile machine. Thereby, operability is improved and made more effective for reducing a manufacturing cost as well as being made more effective for unifying design. Additionally, by having solar battery cells on the surface of the battery power source unit, an assisting power source can be incorporated, and thus operation time can be extended.

The above-embodiment has a feature on the structure of the power source adaptor side. The following embodiment is a portable facsimile machine which has a feature on the construction of the main body of the portable facsimile machine.

Figure 13:
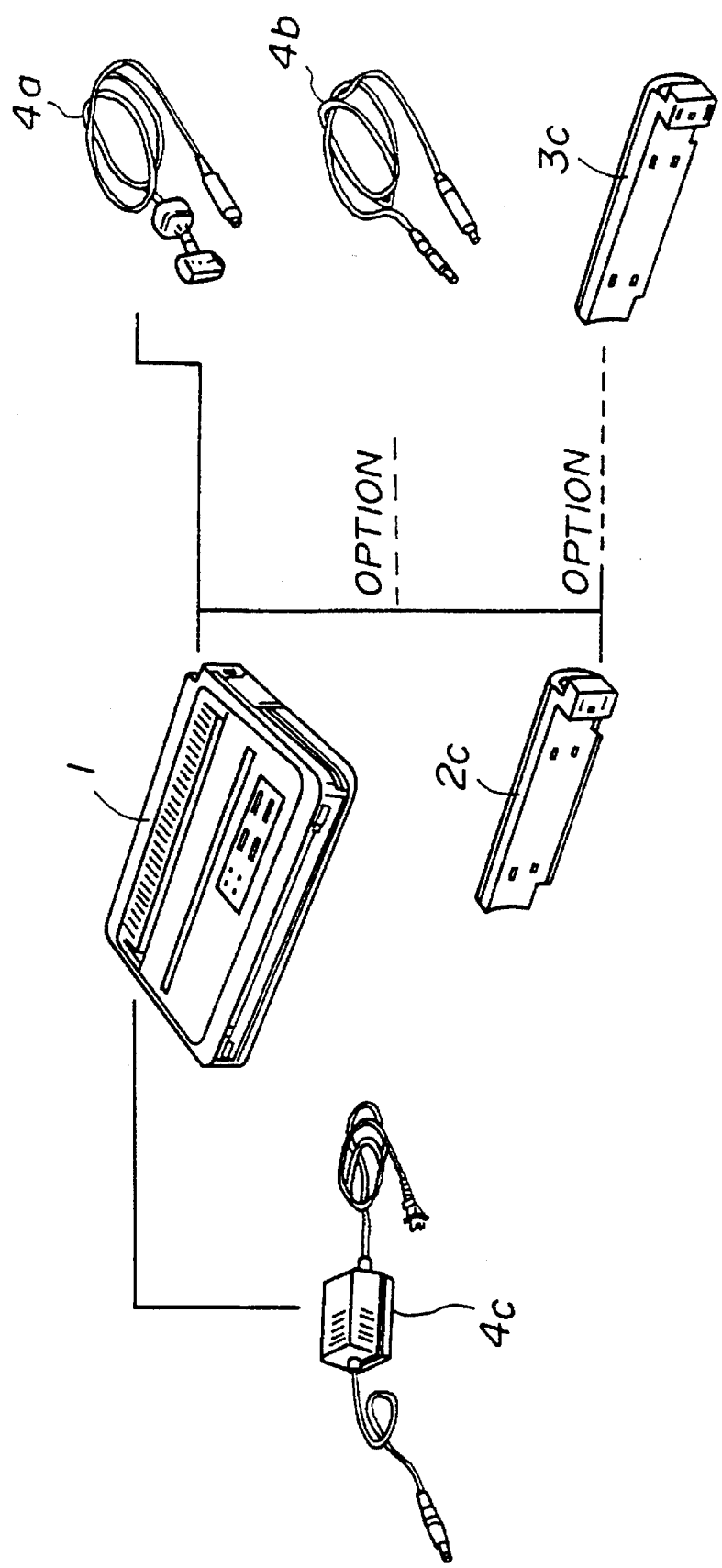
FIG. 13 is an illustration for explaining a structure of another embodiment of a portable facsimile machine according to the present invention.

FIG. 13 is an illustration of a structure of another embodiment of a portable facsimile machine according to the present invention. The portable facsimile machine according to the present embodiment comprises a main body 1, a battery power source units 2c and 3c, a connection cable 4a, and charge connection cables 4b and 4c. The connection cable 4a is used when operating the portable facsimile machine with a car battery power source adaptor. The charge connection cable is used for charging the battery power source with a car battery. The charge connection cable 4c is used for operating the portable facsimile machine with an AC power source and for charging the battery power source unit with an AC power source.

The difference between the battery power source units 2c and 3c is a number of battery cells incorporated therein, and the outer configurations of the units 2c and 3c are the same. It should be noted that the above-mentioned AC power source adaptor 2c can be used instead of the charge connection cable 4c, and also the above-mentioned car battery power source adaptor can be used instead of the connection cable 4a. The charge connection cable 4b is only used for charging the battery power source unit with a car battery and is not needed for other purposes.

The portable facsimile machine according to the present invention has a feature that a battery charger is incorporated in the main body 1 of the portable facsimile machine. The battery charger in the main body 1 is provided as a part of an electric circuit formed on a circuit board 23 as shown in FIG. 12. By this feature, the portable facsimile machine can be operated with an AC power source by using the AC power source, with a car battery by using the connection cable 4a, and with a battery by using the battery power source 2c or 3c.

The battery power source unit 2c or 3c is usually charged with an AC power source through the charge connection cable 4c, however, if needed, a charge can be performed with a car battery by using the charge connection cable 4b.

It should be noted that generality for use can be improved by making the charge connection cable 4c a world-wide type which accepts AC100–200 V.

Figure 14:
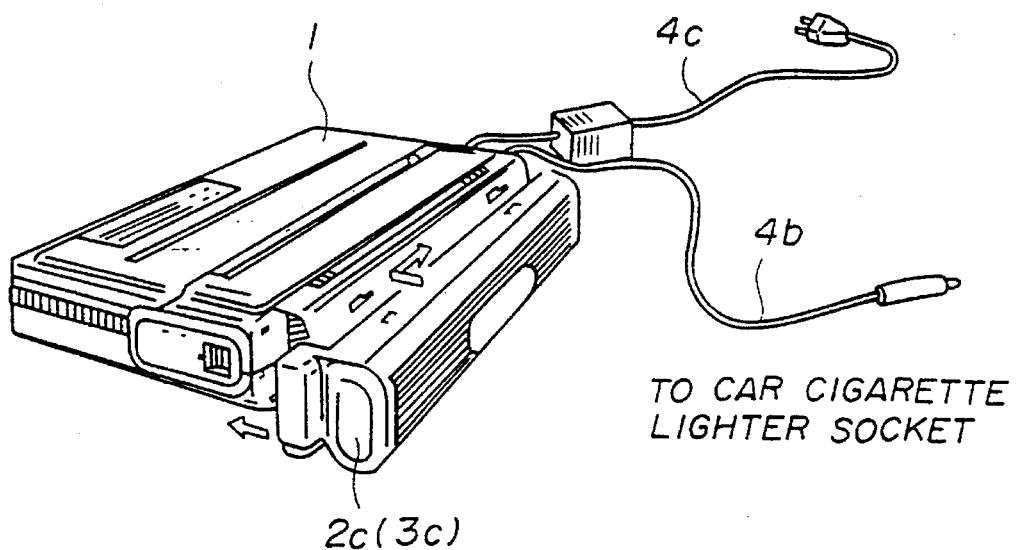
FIG. 14 is a perspective view of the portable facsimile machine shown in FIG. 13 with power source connection cables connected thereto.

FIG. 14 is a perspective view of the portable facsimile machine when operated with the charge connection cable 4c (having an AC/DC converter) for an AC power source or with the charge connection cable 4b for a car battery. In this case, a plug of the secondary side of the charge connection cables 4c or 4b is connected to a DC socket provided on the main body 1 of the portable facsimile machine.

When recharging the battery power source unit 2c or 3c, the respective charge connection cable 4c or 4b is connected to the main body 1 while the battery power source unit 2c or 3c is attached to the main body 1. It is important that the connection between the contact terminals 8a provided on the main body 1 and the contact terminals 8b provided on the battery power source unit 2c or 3c is firm and that a current flowing capacity is sufficiently large; thus a few amperes of current can be used for charging the battery power source unit 2c or 3c during operation of the portable facsimile machine.

If the portable facsimile machine of the present embodiment is used with the AC power source adaptor 2a or the car battery power source adaptor 2b, a charging operation of the battery 2c or 3c is performed by replacing the adaptors 2a or 2c with the battery power source unit 2c or 3c, and then performing the above-mentioned charging operation.

According to the present embodiment, since the battery charger is provided in the main body of the portable facsimile machine, the operability for a charging operation is improved in particular. Further, duplicate parts can be eliminated, resulting in reduction in manufacturing costs.

A description will now be given of another embodiment of the present invention. The embodiment described below is adapted for use with a portable hand-scanner removed from the main body of the portable facsimile machine.

Figure 15:
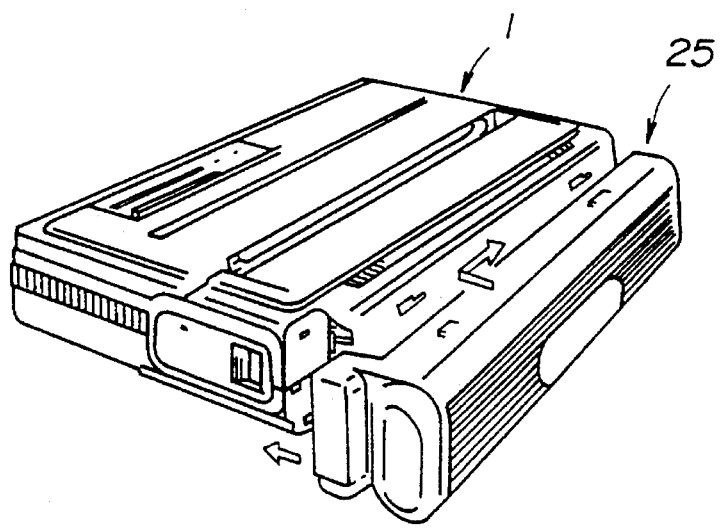
FIG. 15 is a perspective view of another embodiment of a portable facsimile machine.

FIG. 15 shows a perspective view of the portable facsimile machine according to the present embodiment. In this embodiment, a scanner adaptor 25, which is scanning unit for scanning an original document, can be removed from the main body 1 of the portable facsimile machine.

Figure 16:
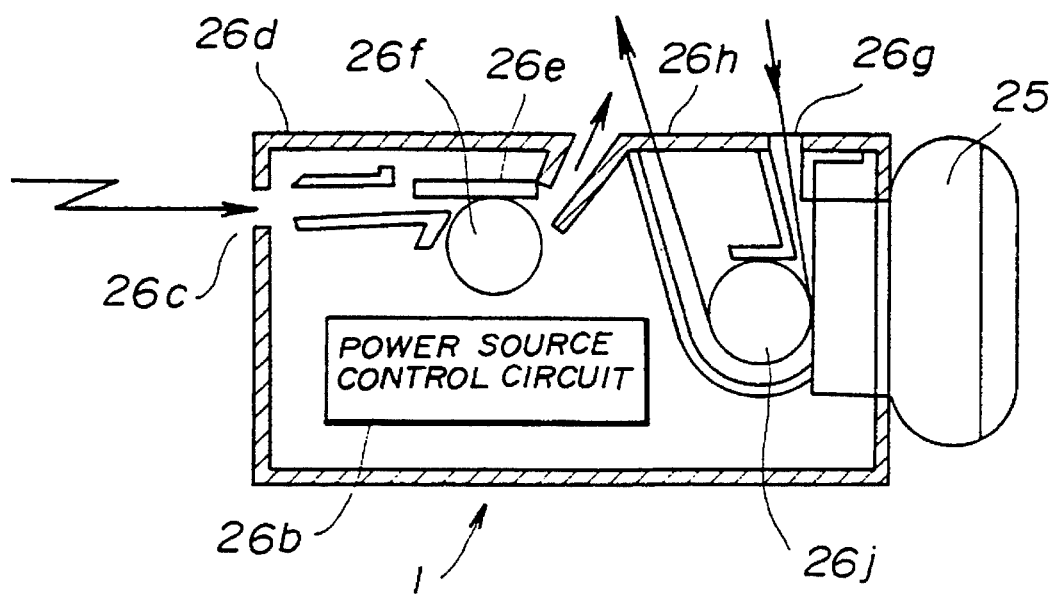
FIG. 16 is a schematic cross sectional view of the main body of the portable facsimile machine with a scanner adaptor attached thereto.

FIG. 16 is a cross sectional view showing a connection between the scanner adaptor 25 and the main body 1 of the portable facsimile machine. Mechanical connection and electrical connection between the main body 1 and the scanner adaptor 25 is the same as described in the previous embodiment for the main body 1 and the battery power source unit 2c; a description thereof will thus be omitted.

Figure 17:
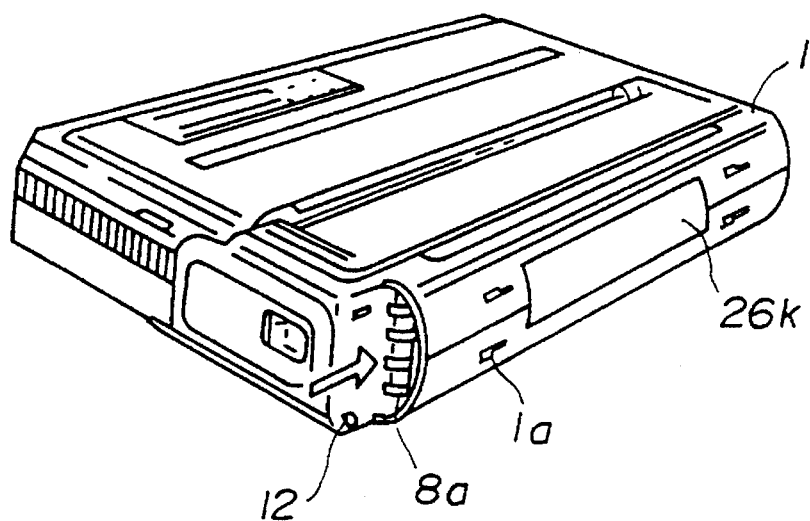
FIG. 17 is a perspective view of the main body of the portable facsimile machine shown in FIG. 15 showing an opening used for attaching the scanner adaptor.

In FIG. 16, notation 26b indicates a power source control circuit, 26c a recording paper insertion opening, 26d a recording paper guide, 26e a thermal head for recording, 26f a platen, 26g an original document insertion opening, 26h an original document ejecting opening, and 26j a platen for a scanner. It should be noted that, as indicated by 26k in FIG. 17, a spring loaded shutter may be provided at an opening on the main body 1 where the scanner adaptor 25 is connected. The spring loaded shutter 26k shown in FIG. 17 is in a closed state.

Figure 18:
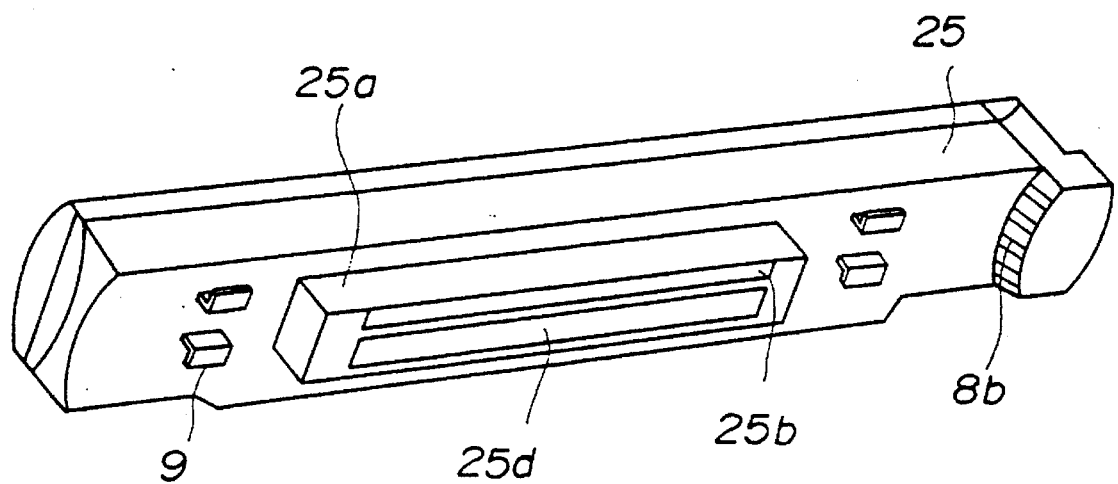
FIG. 18 is a perspective view of the scanner adaptor sown in FIG. 15 viewed from a direction of a scanner unit.
Figure 19:
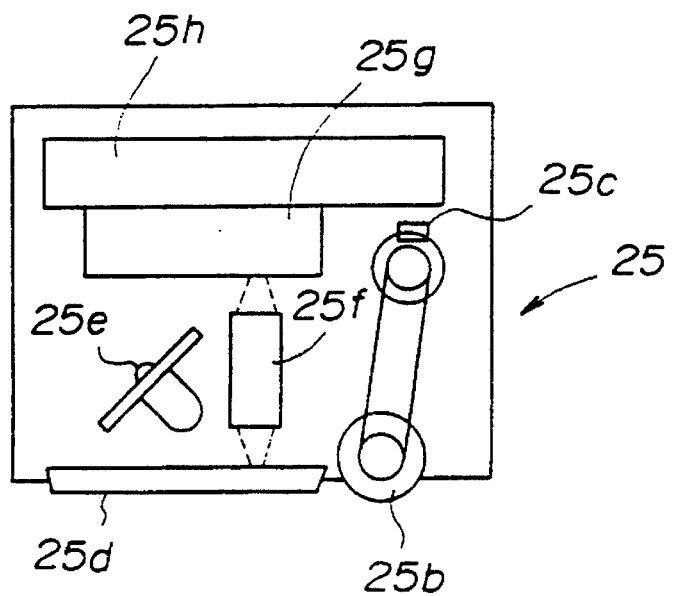
FIG. 19 is a cross sectional view of the scanner unit shown in FIG. 18.

FIG. 18 shows a perspective view of the scanner adaptor 25 viewed from a direction of the scanner unit, and FIG. 19 shows a schematic illustration of a cross section of the scanning adaptor 25.

Figure 20:
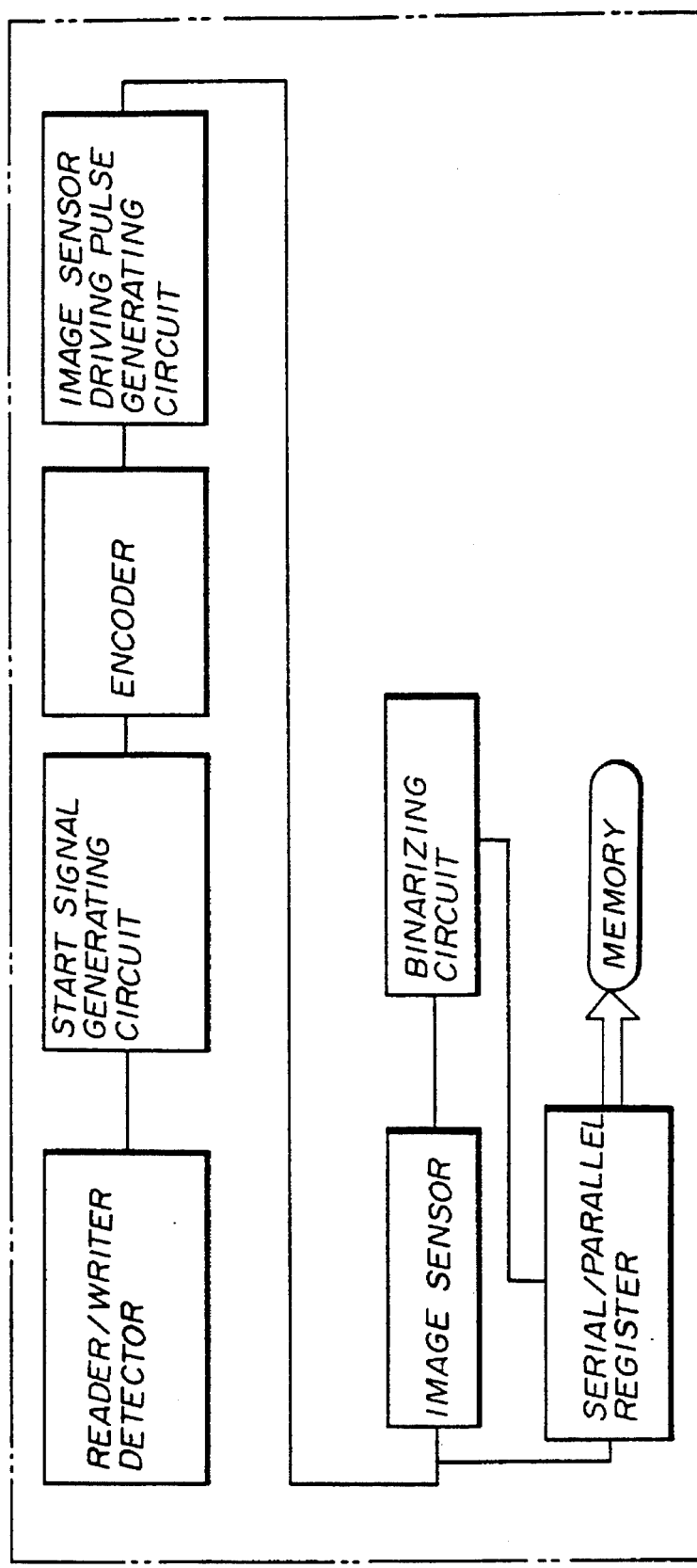
FIG. 20 is a schematic illustration of the scanner adaptor.

In FIGS. 18 and 19, notation 25a indicates the scanner unit, 25b an encoder roller, 25c an encoder, 25d a grass window for scanning an original document, 25e an LED, 25f a lens, 25g a scanning sensor, and 25h a scanning controller. A block diagram of an operation of the scanning adaptor 25 is shown in FIG. 20.

It should be noted that by providing to the scanning adaptor 25 a DC socket for the charge connection cable 4b or 4c, the scanning adaptor 25 can be used as a separate hand scanner by removing the scanning adaptor 25 from the main body 1 of the portable facsimile machine. When the scanning adaptor 25 is attached to the main body 1, power is supplied through the main body 1.

Additionally, the scanning adaptor 25 can be battery driven by equipping a battery cell in the scanning adaptor 25. In this case, as described before with reference to FIG. 4, solar battery cells may be provided on the scanning adaptor 25.

According to the present embodiment, since the scanning adaptor can be used as a hand scanner by removing the scanning adaptor 25 from the main body 1, more generalized use of the portable facsimile machine can be realized.

The present invention is not limited to the specifically disclosed embodiments, and variations and modifications may be made without departing from the scope of the present invention.

What is claimed is:

1. A portable facsimile machine used with various power sources including an AC power source, a car battery power source and a rechargeable battery power source, the portable facsimile machine comprising:

a main body performing a facsimile function and having first mechanical engaging means and first electrical contacting means for electrical power supply; and a plurality of power source adaptors provided separately from said main body and respectively corresponding to one of the various power sources, each power source adaptor having second mechanical engaging means and second electrical contacting means for making contact with said first electrical contacting means so as to supply an electric power to said main body, said second mechanical engaging means and said second contacting means being provided in the same arrangement on each power source adaptor, wherein said first electrical contacting means automatically makes contact with said second electrical contacting means when one of said power source adaptors is attached to said main body by engaging said second mechanical engaging means with said first mechanical engaging means of said main body.

2. The portable facsimile machine as claimed in claim 1, wherein said plurality of power source adaptors includes an AC power source adaptor, a car battery power source adaptor, and a battery power source unit, and wherein these three power-source adaptors have a uniform configuration.

3. The portable facsimile machine as claimed in claim 1, wherein said first mechanical engaging means comprises at least one opening provided on a surface of said main body and said second mechanical engaging means comprises at least one protrusion provided on said power source adaptors, said protrusion being engaged with said opening so as to attach said power source adaptor to said main body.

4. The portable facsimile machine as claimed in claim 3, wherein said opening comprises a wide portion and a narrow portion, and said protrusion comprises a wide-top portion and a narrow-bottom portion, said wide-top portion of said protrusion being wider than said narrow portion of said opening.

5. The portable facsimile machine as claimed in claim 1, further comprising locking means for locking one of said power source adaptors in a state where said power source adaptor is attached to said main body.

6. The portable facsimile machine as claimed in claim 5, wherein said locking means comprises a hole provided on said power source adaptor and a protrusion slidably provided to said main body, said protrusion being inserted into said hole so as to secure said power source adaptor to said main body in the attached position.

7. The portable facsimile machine as claimed in claim 2, wherein said AC power source adaptor and said car battery power source adaptor each have a plurality of ventilating holes on respective surfaces thereof so as to release a heat generated therein to the outside.

8. The portable facsimile machine as claimed in claim 2, wherein said battery power source unit is provided with a solar battery cell on a surface of said battery power source unit.

9. The portable facsimile machine as claimed in claim 2, wherein said AC power source adaptor accepts supply voltage from 100 V to 200 V.

10. The portable facsimile machine as claimed in claim 3, wherein the protrusion is inserted into the opening in a first direction and then slid in a second direction, oblique to the first direction, to lock the power source adaptor to the facsimile machine.

11. The portable facsimile machine as claimed in claim 1, wherein said first electrical contacting means comprises a plurality of first contact terminals and said second electrical contacting means of each power source adaptor comprises a plurality of second contact terminals corresponding to said first contacting terminals of said main body.

12. The portable facsimile machine as claimed in claim 1, wherein each of said power source adaptors is L-shaped having a first portion including the second mechanical engaging means and a second portion, extending in an oblique direction to the first portion, and including the second electrical contacting means.

13. The portable facsimile machine as claimed in claim 12, further comprising:

a spacer replaceably positioned on any of said power source adaptors on an opposite side to the second mechanical engaging means;

a lid replaceably positioned on the spacer for covering the spacer and any of said power source adaptors; and wherein, said spacer standardizes a size of the power source adaptors such that the facsimile machine maintains the same shape and size when each of said power source adaptors are mounted on said facsimile machine.

\* \* \* \* \*